Feb. 14, 1956 J. A. ZENEL 2,734,941

VIDEO RECORDING WITH D. C. BIAS

Filed June 25, 1954 5 Sheets-Sheet 1

INVENTOR.
JOSEPH A. ZENEL
BY Oliver V. Mitchell
ATTORNEY

VIDEO RECORDING WITH D. C. BIAS

INVENTOR.
JOSEPH A. ZENEL
BY
[signature]
ATTORNEY

INVENTOR.
JOSEPH A. ZENEL
BY
ATTORNEY

Feb. 14, 1956 J. A. ZENEL 2,734,941

VIDEO RECORDING WITH D. C. BIAS

Filed June 25, 1954 5 Sheets-Sheet 4

INVENTOR.
JOSEPH A. ZENEL

BY [signature]

ATTORNEY

INVENTOR.
JOSEPH A. ZENEL
BY
[signature]
ATTORNEY

United States Patent Office 2,734,941

Patented Feb. 14, 1956

2,734,941

VIDEO RECORDING WITH D. C. BIAS

Joseph A. Zenel, Princeton, N. J., assignor to Radio Corporation of America, a corporation of Delaware Application June 25, 1954, Serial No. 439,345

6 Claims. (Cl. 178—6.6)

This invention relates to magnetic recording and in particular to magnetic recording of video signals.

The recording of electrical impulses upon a magnetic material has been developed to the point where the recording of audio signals may be accomplished with reasonably good fidelity. A paper or plastic tape impregnated with a ferro-magnetic material such as iron oxide is usually employed as the recording medium. The characteristics of the impregnation are satisfactory for use within the audio range, that is to say from 30 to 20,000 cycles per second. Within this range speeds of 1¾", 3¾", 7½" or 15" per second have proved satisfactory to obtain reasonable audio fidelity. In television, however, signals having a 4 mc. bandwidth are not uncommon and it is apparent that if tape recording is to be effective, the tape speed must be considerably increased. As a rule the fidelity range of the medium is a function of tape speed. If it is desired to reduce tape speed somewhat, a number of parallel channels may be recorded on a wide recording tape but this may entail relatively bulky equipment which may be difficult to maintain and operate.

The characteristics of the magnetic tape currently in use generally are that the response is proportional to the frequency at a rate of approximately 6 db per octave, but beyond a relatively low frequency such as 5,000 cycles the characteristic rapidly drops and some sort of equalization is employed to produce an overall flat response.

Virgin magnetic tape exhibits a non-linear characteristic insofar as the relation of the remanent induction to magnetizing forces is concerned. If a signal is applied to such tape, there will be distortion in the recorded magnetic field. As a result, early workers applied the signal to the remanent magnetism-magnetizing force characteristic so that it varied about an axis centered at the more linear portions of the curve. Unfortunately, this did not give a wide dynamic range of reproduction of the recorded signal. This D.-C. bias was accordingly discarded by later workers in the field, and A.-C. bias was adopted instead. With A.-C. bias, a voltage wave, having a frequency which is a multiple of the highest signal frequency which is to be recorded, is applied to the tape simultaneously with the signals. It is customarily added or superimposed upon the signal information before the latter is fed to the recording transducer. Various explanations of its operation have been brought forward. One writer has analyzed it as splitting up the audio signal at a very high frequency rate, one portion of which is applied to one linear section of the transduction curve while the other portion is applied to another linear section of the same curve. A different qualitative explanation for the operation of A.-C. bias may be found by reference to "Magnetic Recording" by S. J. Begun (Murray Hill Books, 1949) beginning at page 57. Whatever the explanation, there has been almost unanimous belief that A.-C. bias is a great improvement over D.-C. bias. The present invention discloses a method for the reproduction of high frequency signals which does not employ an A.-C. bias, but instead uses D.-C. bias in a particular manner.

Ordinarily, when A.-C. bias is used, it is added to the signal to be recorded and is most commonly applied to an initially neutral recording medium which may be virgin tape or a previously recorded tape which has been subjected to an A.-C., high frequency magnetic field.

When A.-C. bias is used for the recording of signals either in the audio range or up to 100 kc. for example, it is relatively easy to use a bias having a frequency which is a multiple of the highest frequency of the signals to be recorded. Thus, for audio an A.-C. frequency of 30 kc. or 45 kc. is not uncommon. Use of an A.-C. bias having this frequency prevented any "beat notes" from arising as a result of interaction between the information signals and the bias frequency. It is obvious that if the same technique were to be applied to video recording many difficulties would ensue. It is extremely difficult to impress frequencies within the television range, i. e. 0–4 mc., on a tape. Still more difficult would be an attempt to apply frequencies of 8 mc. or 12 mc. to the tape. It would entail costly and difficult processes to manufacture a transducer capable of accomplishing this. Furthermore, frequencies of this order would probably cause the windings of a coil within such a transducer to burn out. This could be prevented by using large cross-section wire which could be cooled externally, but problems of confining the applied magnetic field and undesired bulkiness arise.

It has been noted previously that if a saturating magnetizing force is applied to a medium which is in either a pristine or pre-recorded state, the tape exhibits a different characteristic. The non-linearities existing in virgin tape are overcome to an extent so that a greater portion of the curve may be used which means that a greater dynamic range may be possible. If the magnetizing force comprising the signal information is positioned at an optimum point along the linear portion of this characteristic curve, improvement may be possible. This method of magnetic tape recording, i. e., magnetically saturating the tape in a certain direction, and then impressing the signals on the medium at a specified operating point, which has been set by means of a D.-C. bias, yielded to high frequency bias as the range of frequencies to be impressed upon the magnetic medium increased. For relatively low quality audio work and computing machines, the D.-C. bias method still possessed utility.

According to this invention, wideband video signals, such as the range encompassed by present United States broadcast television signals, including the direct current component, are recorded and reproduced from a movable magnetic medium by means of a presaturation of the magnetic medium, and the subsequent impressing of the video signals including the D.-C. component thereupon, together with a D.-C. bias. In one form of the invention the D.-C. bias has been so applied that the synchronizing signals are maintained at the point on the remanent magnetism-magnetizing force curve of the saturated medium which permits the greatest useful range of the picture information to occupy the greatest portion of the linear section of that curve.

It is, therefore, an object of the present invention to provide a system for recording and reproducing high frequency waves on a movable magnetic medium.

Still another object of the invention is to provide a system for the recording and reproducing of television signals on a magnetic tape.

Another object of the invention is to provide means for including the direct current and low frequency components of a video signal in the recording of the magnetic medium.

A further object is to provide proper bias during the recording of television signals on magnetic tape.

Other objects of the invention, as well as a more complete understanding of its operation, may be found by reading the following specification and claims and referring to the drawings, in which:

Figures 3, 4:
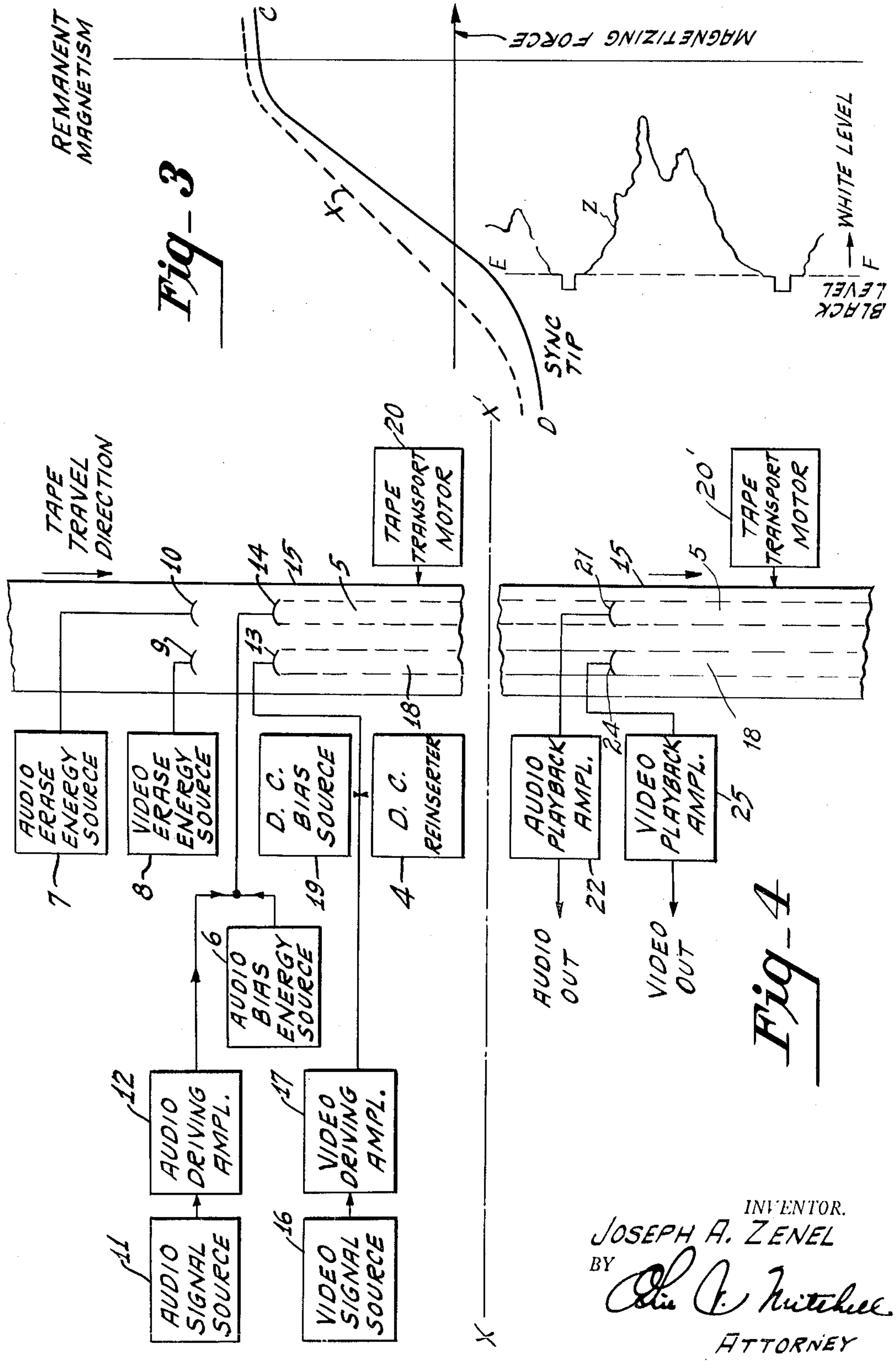
Figure 3 is a curve derived from Figure 1 which shows remanent magnetism plotted against values of magnetizing force if the tape is first saturated.
Figure 4 is an overall block diagram of the operation of a magnetic recording system employing the present invention.

Figure *5a* is a sectional view of a transducer which may be used in the system illustrated in Figure 4;

Figure *5b* is a sectional view of a transducer similar to that of Figure *5a* as modified for applying bias in a different way.

Figure 6:
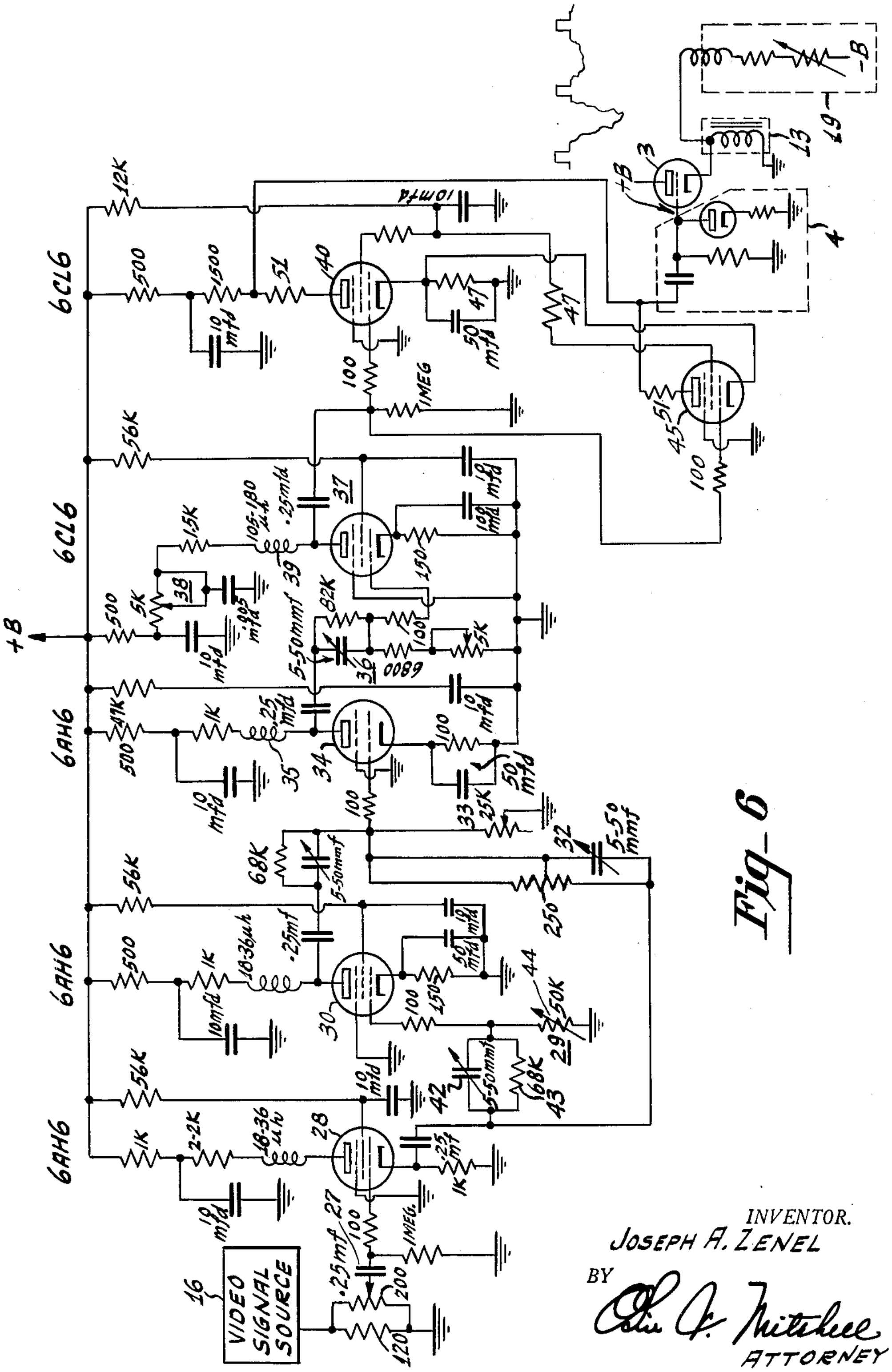
Figure 7:
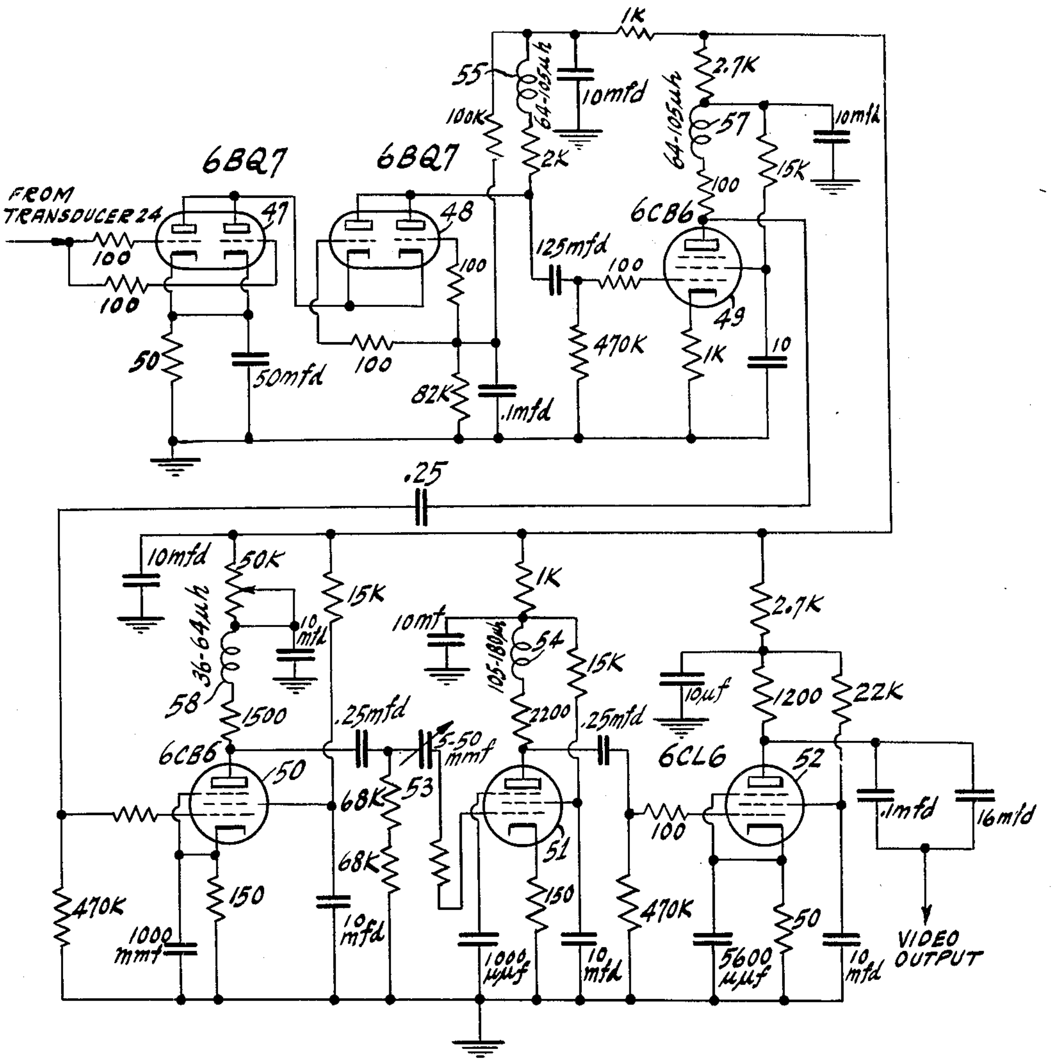

Figure 6 is a circuit for one possible type of equalizing or driving amplifier that may be used in the overall system shown in Figure 4; and Figure 7 is a circuit diagram of a playback amplifier that may be incorporated in the overall system of Figure 4.

Figures 1, 2:
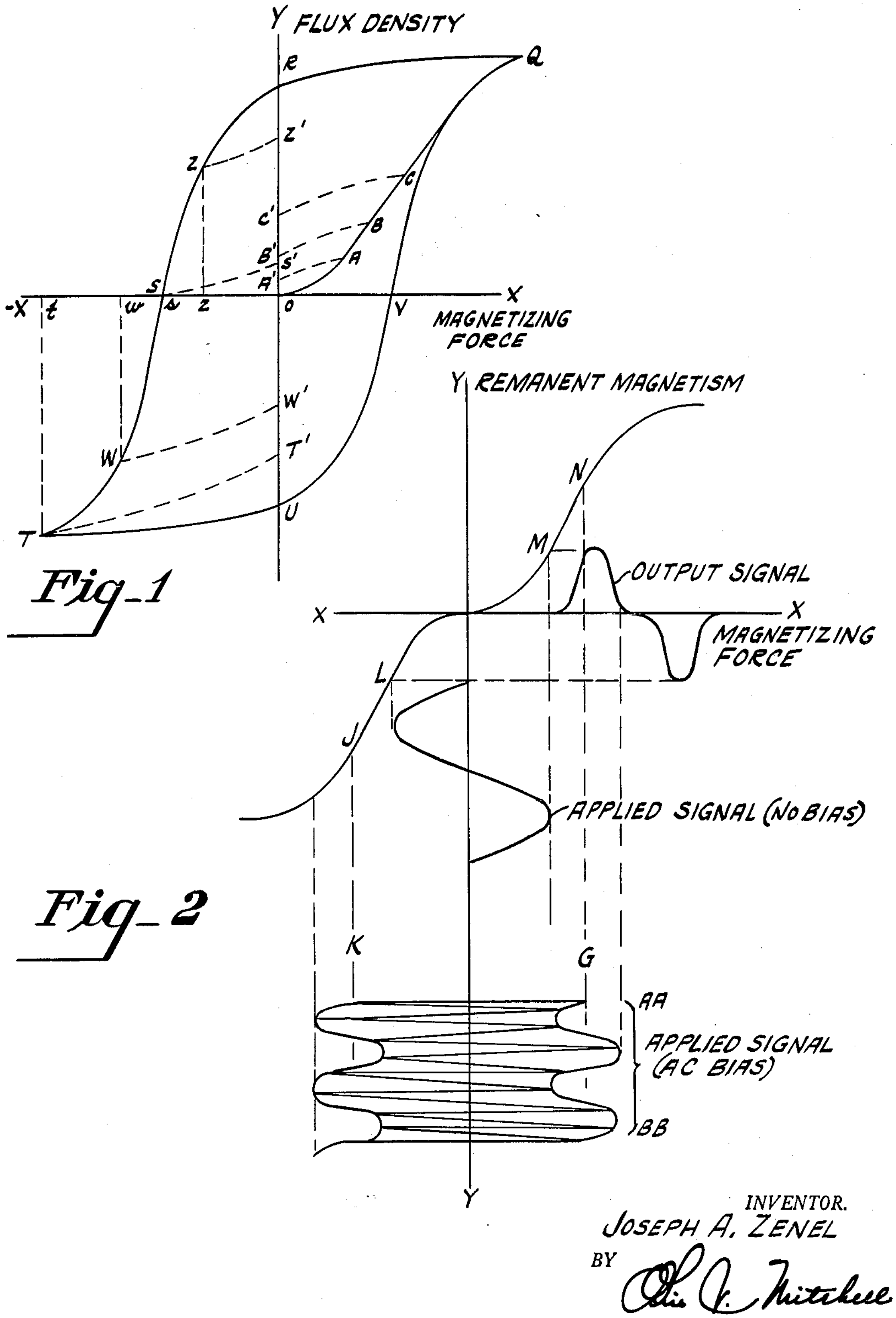
Figure 1 is a typical hysteresis curve showing the flux density plotted against the magnetizing force applied.
Figure 2 is a curve showing remanent magnetism plotted against magnetizing force for a virgin magnetic medium.

Referring to Figure 1, a typical hysteresis loop is shown for a magnetically neutral medium. The Y axis represents the flux density, and the X axis represents the magnetizing force. Beginning at a point O at the origin of an increasing magnetizing force is initially applied as shown by the curve OPQ, and if at Q the force is gradually reduced, the flux density diminishes along the portion QR.

The point R as on the Y axis represents the remanent magnetism when the magnetizing force is cut off. When the magnetizing force caused by the applied current is thus reduced to zero, the height OR of the Y axis is indicative of this residual or remanent magnetization in the medium. If the magnetizing current is then applied in the opposite or −X direction the flux density decreases from the point R along the curve portion RS until it meets the X axis at S. If the reverse magnetizing current is increased still further, and then a full cycle of current changes is completed, the curve assumes the shape of QRSWTUVQ.

It is also possible to plot a curve in the following way. Beginning at the origin O the magnetizing force is increased to A and then cut off. It will be found that there is a remanent magnetism induced in the tape represented by the letter A′ on the Y axis. Similarly, if the magnetizing force were applied from the origin O and brought up to successive levels B and C and, after attaining each of these points, is cut off, corresponding magnitudes of remanent magnetism denoted by the letters B′ and C′ would result. It is then possible to plot the points A′, B′ and C′, etc. as a function of the magnitude along the X axis of points A, B, C, etc. This would produce a curve which is shown in Figure 2.

In Figure 2 it is to be noted that a portion of the curve from points L to M is not linear and takes the form of a knee portion LM. If a signal is applied which is centered on the Y axis, the knee portion LM will introduce distortion into the signal as recorded. One previous method of recording was to apply the signal, not centered on the Y axis, but centered on either of the dashed vertical lines JK or NG. In this way, the linear portions of the curve were empolyed, but at the expense of the possible dynamic range. If an A.-C. bias were used in conjunction with virgin or A.-C. erased tape, the applied signal would resemble the signal shown at AA—BB and up to a certain range of frequencies this proves to be quite satisfactory.

In Figure 3 a different type of curve is plotted. Again we shall refer to Figure 1, but this time it will be assumed that the tape is initially presaturated in the +X direction until point Q on the hysteresis loop is reached. This is accomplished by applying a D.-C. electric magnetic field, or by positioning a permanent magnet in proximity to the tape.

Let us assume further, that certain amounts of magnetizing force Z, S, W and T in the −X direction are successively applied to the tape, and then cut off. It is seen that corresponding amounts of flux density Z, S, W and T are induced in the tape. When the applied force is cut off, however, corresponding quantities of remanent magnetism Z′, S′, W′ and T′ are still on the tape. If the points Z′, S′, W′ and T′ are plotted as a function of Z, S, W and T, the solid line curve of Figure 3 is obtained. It is seen that a substantial portion of this transfer characteristic is quite linear, and that satisfactory recording will result if the information signal is made to fall upon it.

The curve CD as shown is an oversimplification and represents the static characteristic for a D.-C. condition. In practice the curve CD will shift somewhat as a function of the frequency of the current causing the magnetic flux. As the frequency increases there is a tendency for the slope of the curve to decrease and shift as shown by the dashed line curve. Since the video signal contains many different frequencies, the curve will really exhibit a dynamic characteristic. It would therefore be advantageous to choose the operating point such that the impressed signals will be made to fall upon the most linear portion for the frequencies most common in the television image.

Using the recording characteristic shown in Figure 3 in which the tips of the sync signals are aligned and made to fall close to one end of the linear portion of the curve CD, so that black level is on the vertical line EF it is seen that the "white" region extends toward the right of the line EF. If the television signal Z is so placed that blanking level falls along the vertical dashed line EF, it may be seen that the picture information occupies most of the linear portion of the curve. The sync pulses may even be compressed or reduced in amplitude if it is desired to exploit fully the linear portion. The operating point E may be obtained by biasing the recording transducer with a certain amount of D.-C. Since black level is placed on line EF, sync will fall in a non-linear region, but this will not effect the operation to any appreciable extent.

As a matter of fact, the use of presaturation and a D.-C. bias have been successful in magnetically recording television signals which when later reproduced provide good quality television pictures. If the signals are recorded on a single track, the entire 4 mc. range of television should be impressed thereupon. In Figure 4 an over-all recording-reproducing system is illustrated. If it is desired to impress the sound portions of a television program on the magnetic tape, an auxiliary audio system may be employed. In this case an audio signal source 11, such as a microphone, would be coupled to an audio driving amplifier 12 which is itself coupled to a transducer 14. A source 6 of audio bias energy is also coupled to transducer 14. The source 6 may furnish an A.-C. bias having a frequency which is three or four times higher than the highest audio signal to be reproduced. The transducer 14 is substantially in proximity with the tape 15 and converts the electrical variations fed to it into corresponding magnetic variations which appear in the tape 15.

A source 16 of video signals, such as the output of a second detector of a conventional television receiver or a point just prior to the RF section of a television transmitter, is coupled to a video driving amplifier 17. The driving amplifier 17 is coupled to transducer 13 which is in contact with the tape 15 so as to impress magnetic variations upon track 18. Since the D.-C. component is included in the video signal at the point just prior to the RF section of the television transmitter, a D.-C. coupled driving amplifier may alternatively be employed provided a D.-C. coupling is made between the point just prior to the RF section and the transducer 13 to include the D.-C. component in the recorded information. In the form of the invention shown in Figure 4, D.-C. reinserter 4 reinserts the direct current component of the video signal so that the direct current component of the video signal will be recorded on tape 15 by transducer 13.

A D.-C. bias source 19 is also coupled to the transducer 13 and the direct current therefrom is added to the signals from driving amplifier 17.

Ahead of the transducers 13 and 14 are two transducers 9 and 10. They are coupled respectively to video erase energy source 8 and to audio erase energy source 7 respectively. It is the function of these sources to obliterate, remove, or otherwise neutralize whatever stray or pre-recorded magnetic areas exist in the tape before recording is to take place. The audio erase energy source 7 may be of the conventional A.-C. type wherein a supersonic electrical wave is fed to the transducer 10 which leaves the portion of the tape 15 in proximity to it in an essentially neutral condition magnetically. The D.-C. type of erase may be used with the audio rather than the aforementioned A.-C. type of erase if desired.

The video erase energy source 8 may be of the type which supplies a constant D.-C. to the transducer 9 to produce a uniform magnetic field which is preferably of such intensity as to saturate the magnetic particles within the tape. However, the source 8 and the transducer 9 may be supplanted merely by a strong permanent magnet which is properly polarized for saturating a portion of the tape in a given direction.

In Figure 4 the application of a D.-C. bias is shown as being a direct connection from the D.-C. bias source 19 to the recording transducer 13. This is purely a schematic representation and, in practice, the application of the D.-C. bias may not require any such ohmic connection.

Figure 5A:
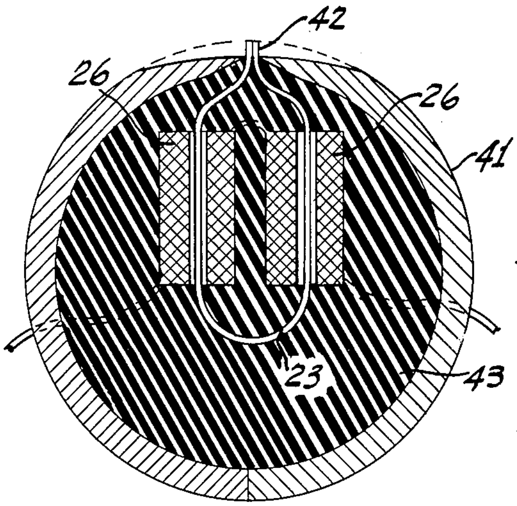
Figure 5B:
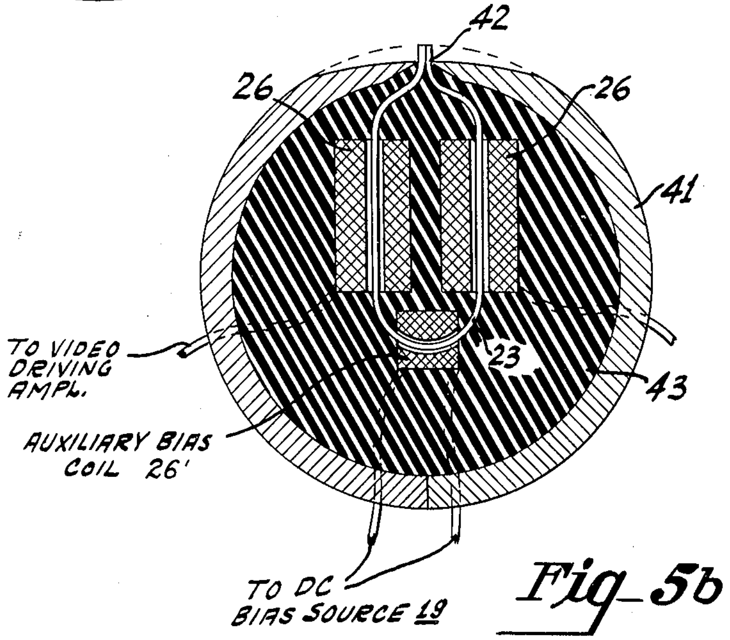

In Figure 5*b* a transducer is shown which could be used for applying the bias to the tape. Its construction is essentially the same as that of Figure 5*a*, which will be described in more detail below, except for the fact that an auxiliary coil 26′ is wound on the core 23 and is fed by energizing it with a D.-C.

It is also possible to have an arrangement whereby one transducer, which is energized by the information to be recorded, is located on one side of the tape, whereas an auxiliary transducer is located diametrically opposite the signal transducer in proximity to the opposite side of the tape. The auxiliary or bias transducer would be energized by a D.-C. to provide the same effect as that of a direct resistive connection to the transducer as shown in Figure 4.

It should be noted that for the purposes of one form of this invention the tape should be magnetized uniformly in a given direction before it is subjected to the transducer for impressing the signal frequencies to be recorded. If the application of such a constant magnetic field to the tape also overrides or erases whatever signals may previously have been recorded thereupon, that is incidental with respect to the essential spirit of this invention. For example, even if there were previously recorded signals on the tape, they might be essentially neutralized by applying an A.-C. erase frequency first. Then the constant magnetic field would be applied before recording was to occur. Even if virgin tape was used it would still be necessary to apply the constant magnetic field before impressing the information signals thereupon.

By proper manipulation of the variable controls in the phase shifter and the low frequency boosters and attenuators, it is possible to compensate for the non-linear characteristics mentioned previously which cause extensive low frequency and high frequency attenuation, and phase shifts in wideband operation.

Below the horizontal dashed line X—X′ is pictured the reproducing part of the overall tape system. A tape drive motor 20′ is coupled to the tape 15 by means of a capstan (not shown) or other mechanical means. It may be similar to the tape drive motor 7 used on the recording end. A set of reproducing transducers 21 and 24 may have characteristics essentially the same as those of their counterparts 13 and 14 used to impress the signals upon the tape. Transducer 21 is coupled to an audio playback amplifier 22 which may be of the conventional type used in sound recording. Its function is to amplify and equalize, if necessary, the reproduced signals for the degree of fidelity required.

The transducer 24 is coupled to the recorded track 18 and converts the magnetic variations in that portion of the tape into corresponding electrical variations. These electrical variations are then applied to video playback amplifier 25. The amplifier 25 should preferably take into account the nature of the distortions and losses introduced by the tape and the transducing heads and correct them. A full description of one particular type will be given below in explanation of Figure 7. The amplifier 25 produces an output signal which may ultimately be used for broadcast purposes, for application to a coaxial line, or for immediate playback by application to a video monitor.

Figure 5*a* shows one type of transducer which may be used as transducer 13 or transducer 24 for impressing or recovering as the case may be the video signals. It comprises a core 23 made of a thin ribbon of high magnetic permeability metal foil. This foil is threaded through suitable field coil means 26. The core 23 is then bent to form a substantial magnetic metal loop. A housing 41 of non-magnetic metal encircles the core 23 structure and its associated coil 26. The housing 41 clamps the ends of the ribbon-like core member together to define a signal translating gap 42. The cavity defined by the housing member is filled with a plastic material 43 which surrounds the core and coil structure. Additional details of its construction may be found in the copending application of J. A. Zenel and A. R. Morgan, Serial No. 380,854, filed September 17, 1953, and entitled "Magnetic Record Transducer." It is to be understood that any transducer capable of impressing or reproducing video frequencies may be used with the system.

The video driving amplifier 17 should possess equalizing characteristics which take into account the characteristics of the magnetic medium, the particular type of transducer, and the apparatus to be used on the playback end of the system for recovering recorded signals. One driving amplifier which has been proven useful is illustrated in Figure 6. Its operation, except for the coupling to the recording transducer is essentially the one described in detail in the copending application of W. D. Houghton, Serial No. 519,420, filed July 1, 1955, and entitled "Dynamic Bias System for Video Recording." The output of video signal source 16 is coupled by way of condenser 27 to the control electrode of a cathode follower tube 28. Its output takes two paths, one of which is through high frequency and phase shifting network 29 which includes variable condenser 42 and resistor 43 and variable resistor 44. This network 29 is connected to the input electrode of amplifying pentode 30 by way of a 100 ohm resistor. The peaking part of network 29 is composed largely of condenser 42 and resistor 43. The ratio of the capacity of condenser 42 to the resistance of resistor 44 determines the amount of phase shift and the amplitude of the high frequencies in this path. The output of amplifier 30 is coupled to another high frequency phase shifter and peaking network 31 which includes a resistor of, for example 68K ohms in parallel with a variable condenser ranging from 5 to 50 MMF. and variable resistor 33.

Another portion of the output of cathode follower 28 is applied to a high frequency phase shifting network 32 consisting of a 5–50 MMF. variable condenser, a 250,000 ohm variable resistor and the 25,000 ohm variable resistor 33. This network shifts high frequency components from that portion of the video signal appearing in the output of tube 28 which is not passed through circuits 29, 30 and 31. The ratio of the 250,000 ohm variable resistor in series with the grid of tube 34 to the tapped portion of variable resistor 33 determines the phase shift of the high frequencies in this branch. At the input electrode of amplifier tube 34 there is thus a wave composed of a wave passed through phase shifter and peaker 31, and a wave from the phase shifter and peaker 32. The output of amplifier 34 is coupled to high frequency peaking coil 35, which with its distributed capacity is a tank circuit and also through a .24 mfd. condenser to high frequency peaker 36 which includes an 82,000 ohm resistor across 5–50 mmf. variable condenser. The peaker 35 does not contribute much to the peaking action in comparison with peaker 36, and thus may be dispensed with if desired. Peaker 36 is coupled through a 100 ohm resistor to the control grid of amplifier stage 37 in whose plate circuit appears a high frequency peaker 39 (which may be omitted if desired) in series with a low frequency booster 38. The resulting output is applied via a .25 mfd. condenser from the plate of amplifier 37 via a 100 ohm resistor to the control grid of amplifier 40. The latter is in parallel with amplifier 45 which with amplifier 40 combines to produce an output sufficient to drive recording head 13.

Within the dashed line box 4 is pictured one method of obtaining the D.-C. reinsertion as shown in Figure 4. Shown is a very simple type in which the tips of the sync pulses cause conduction of the diode and charging of the condenser which produces a bias on the final amplifying tube 3. Coupled to the cathode of the diode within block 4 are a condenser and a resistor which form the necessary time constant circuit. Since the condenser is in series with the grid of tube 3, the D.-C. component will be lost. If the value of this condenser is chosen to be approximately .25 mfd. in one illustrative case, the resistor coupled to the cathode has approximately 1 megohm resistance, the restoration will be accomplished.

The cathode of tube 3 is coupled through a winding which is shown in dashed line box 13 to ground. The winding is a schematic representation of the coil which comprises the chief element of the transducer 13.

Within box 19 a variable resistor is shown which is coupled to a source of —B potential and to the transducer 13. By proper manipulation of this variable resistor, the operating point on the remanent magnetism-magnetizing force curve shown in Figure 3 may be obtained. The fixed resistor prevents shorting out of the coil of the transducer. When the variable resistance is made zero, the inductance in series with the fixed resistor prevents high frequencies from being shorted to ground rather than through the transducer 13.

Of course, there are many other ways of applying the D.-C. bias. For example, if, instead of using the single diode shown in box 4, certain types of keyed double diode clamps are used, it may not be necessary to insert the operating point potential by apparatus such as that shown in box 19. The keying pulses for the keyed D.-C. restorer or clamp circuit themselves could supply a definite D.-C. value which would be similar to the bias supplied from the box 19.

Figure 7 shows one possible playback amplifier that may be employed to raise the level of the electrical variations produced by the transducer 24. It is described in detail in the Houghton application which was previously mentioned. The input signals are applied to a double amplifier tube 47 whose sections are in parallel with one another. Their combined output is applied via a direct coupling to the cathodes of another double amplifier tube 48 each of whose sections is also in parallel. Effectively, tube 47 and tube 48 are in series so that one operates as a variable resistance in series with the other. This arrangement has been known variously as a "driven-grounded-grid," "totem," or "cascade" circuit, and has proved to be extremely sensitive with a very high signal-to-noise ratio. This type of circuit is fully described in an article by R. M. Cohen appearing in RCA Review, March 1951, at page 3. The high frequencies in the output of tube 48 are peaked by coil 55 and applied through a .25 mfd. coupling condenser in series with a 100 ohm resistor to the control grid of pentode amplifier 49. The output of the latter is high peaked by coil 57 and fed to the input of amplifier tube 50 whose output is also high peaked by coil 58 and coupled via high frequency peaking circuit 53 consisting of a 5–50 mmf. condenser across a 68,000 ohm resistor to the input of amplifier tube 51. In the plate circuit of the latter a high frequency peaking coil 54 is inserted and the signal is then coupled to the input electrode of tube 52. The video output for 75 ohm utilization circuits, is taken from the plate of amplifier tube 52 by way of a circuit consisting of a .1 mfd. condenser in parallel with a 16 mfd. condenser.

Many refinements may be introduced into the basic system shown in Figure 4. For example, a system for controlling the velocity of the magnetic tape may be provided. One such system is described in the copending application of W. D. Houghton mentioned above. According to that system, on the recording end synchronizing signals are recorded, as well as the picture information, either on the same area of the tape or on a different area. A reproducing transducer is placed a short distance away from the recording transducer and recovers the recorded sync signals which are then applied to a phase comparison device. The source of the original sync signals are also applied to the phase comparison device. Should the phase of the two sets of sync pulses depart from a predetermined mutual phase relation, an error voltage is derived which is fed to a speed control system which governs the tape drive motor 7. The system may be used either at the recording end alone or at the reproducing end or at both. If it is used on the reproducing end, the recorded sync is extracted and compared in phase with sync from a highly stable source. In this case also, if the phase should depart from a predetermined relation, the tape drive motor 20 is governed in accordance therewith.

For broadcast purposes, it is necessary that prescribed standards for the broadcast signal be complied with. Devices known as "stabilizing amplifiers" are commonly employed in television stages for improving the waveform of the synchronizing signals, removing noise, and removing low frequency disturbances. They are especially valuable when the source of the video signals is the output of a coaxial line whose input originates at a distant point. Because of frequency discrimination the sync pulses may be attenuated and misshapen. In such cases, it would be advantageous to interpose a stabilizing amplifier between the video signal source 16 and the video driving amplifier 17 in Figure 1. It may also be advantageous to insert a stabilizing amplifier after the video playback amplifier 25 shown in Figure 4 if the output of the amplifier 25 is ultimately to be applied to the R. F. section of a video transmitter. A description of a typical stabilizing amplifier may be found in an article beginning at page 34 of "Broadcast News" for May 1948.

It may also be pointed out that since audio signals are in a relatively low frequency band with respect to the video band, and since the tape 15 will be transported at a rather fast rate, the physical wave length of the recorded magnetic variation will be relatively long. Therefore, the change of flux, induced by such a long wave length on playback with respect to the pole pieces of the transducer, will cause a relatively small electrical output in the audio playback transducer 21. For this reason it has been proposed that the audio frequencies be used to modulate a carrier, such as 150 kc. or 500 kc. either in amplitude or in frequency, before they are impressed on the tape. Of course, in this case, it is necessary to employ an appropriate detecting stage on the playback end before the audio can be recovered.

The invention is not limited merely to monochrome television recording systems since its principles are equally applicable to color television systems. In a system such as that disclosed in the copending application of W. D. Houghton, Serial No. 519,420, filed July 1, 1955, entitled "Dynamic Bias System for Video Recording" three wideband voltage waves representative of three selected color components of a television image are impressed on different tracks. Sync is recorded on a fourth track. A presaturated medium and D.-C. bias may be used with each separate track if desired. Since the bandwidths of the four types of signals are essentially similar, the D.-C. bias could conceivably originate in a common source. If the color television signals to be recorded are similar to the ones approved for United States broadcast use by the Federal Communications Commission, there may be three or four different bandwidths to contend with. The copending application of H. F. Olson, Serial No. 368,110, filed July 15, 1953, and entitled, "Video Recording System" treats of a system whereby the so-called luminance or Y signal, the Q signal and the I signal are impressed on separate tracks of a magnetic tape. The Y signal has a bandwidth of 0–4 mc., the Q signal a bandwidth of 0–.4 mc., and the I signal a bandwith of 0–1.5 mc. For each of these it may be desirable to bias the signal at a different operating point of the curve shown in Figure 3. The presaturation of the medium would naturally precede the application of bias in this case also. Other systems for recording wideband information such as color television recording systems, lend themselves readily to the technique of presaturation and D.-C. biasing so that the present invention may profitably be utilized in them.

Having described the invention, what is claimed is:

1. In a system for recording on a moving magnetic recording medium television signals containing a video frequency picture component, and a periodically recurrent synchronizing pulse component, said pulse component being uniformly defined by signal waveform excursion exceeding in amplitude those signal excursions defining said picture component, said magnetic recording medium having a remanent magnetism-magnetizing force characteristic graphically depicted by a substantially S-shaped curve having a curved lower portion representing remanent flux storage characteristics for low magnetizing forces, a substantially linear central portion representing remanent flux storage characteristics for a range of moderate magnetizing forces and a curved flattened upper portion representing flux storage characteristics for higher magnetizing forces, the combination of: a source of television signals of the type described; a television signal amplifier means having an input circuit and output circuit; means operatively coupling signals from said source to said amplifier input circuit; a magnetic recording transducer including means for transducing an applied electrical signal into representative variations in a magnetic recording field such that said recording transducer when in recording relation to a moving magnetic recording medium is capable of imposing a varying magnetizing force productive of remanent field patterns on said medium representing a record of applied electrical signals; means operatively coupling said amplifier output circuit to said recording transducer for application of amplified signals to said transducer; means included in said amplifier means for establishing the amplitude of signal applied to said transducers such that the resultant recording field produces recording magnetizing forces within the substantially S-shaped characteristic of the recording medium upon which said transducer is caused to operate; and direct current clamping means direct current coupled with said transducer for establishing the recording current through said transducer at substantially a fixed value during each recurrent synchronizing pulse component regardless of variations in video frequency picture content, said clamping means including means defining said fixed value of current such that the peak of each synchronizing pulse falls in one of said curved portions in said S-shaped characteristic and such that a majority of picture component signal excursions fall along the central linear portion of said S-shaped characteristic.

2. In a system for recording on a moving magnetic recording medium television signals containing a video frequency picture component, and a periodically recurrent synchronizing pulse component, said pulse component being uniformly defined by signal waveform excursion exceeding in amplitude those signal excursions defining said picture component, said magnetic recording medium having a remanent magnetism-magnetizing force characteristic graphically depicted by a substantially S-shaped curve having a curved lower portion representing remanent flux storage characteristics for low magnetizing forces, a substantially linear central portion representing remanent flux storage characteristics for a range of moderate magnetizing forces and a curved flattened upper portion representing flux storage characteristics for higher magnetizing forces, the combination of: a source of television signals of the type described; a magnetic recording transducer including means for transducing an applied electrical signal into representative variations in a magnetic recording field such that said recording transducer when in recording relation to a moving magnetic recording medium is capable of imposing a varying magnetizing force productive of remanent field patterns on said medium representing a record of applied electrical signals; direct current biasing means operatively coupled with said transducer to establish a current therethrough productive of a static magnetizing force which when imposed upon a magnetic recording medium falls along one of said curved portions of the S-shaped characteristic of the recording medium upon which said transducer is caused to operate; and direct current clamping means direct current coupled with said transducer responsive to the synchronizing pulse component of said television signal to maintain magnetizing forces produced by said transducer in response to said synchronizing pulses at a substantially fixed position on that curved portion of said S-shaped characteristic along which said static bias magnetizing force falls.

3. In a system for recording on a moving magnetic recording medium television signals containing a video frequency picture component, and a periodically recurrent synchronizing pulse component, said component being uniformly defined by signal waveform excursion exceeding in amplitude those signal excursions defining said picture component, said magnetic recording medium having a remanent magnetism-magnetizing force characteristic graphically depicted by a substantially S-shaped curve having a curved lower portion representing remanent flux storage characteristics for low magnetizing forces, a substantially linear central portion representing remanent flux storage characteristics for a range of moderate magnetizing forces and a curved flattened upper portion representing flux storage characteristics for higher magnetizing forces, the combination of: a source of television signals of the type described; a magnetic recording transducer including means for transducing an applied electrical signal into representative variations in a magnetic recording field such that said recording transducer when in recording relation to a moving magnetic recording medium is capable of imposing a varying magnetizing force productive of remanent field patterns on said medium representing a record of applied electrical signals; direct current biasing means direct current coupled with said transducer to establish a bias current therethrough productive of a static magnetizing force which when imposed upon a magnetic recording medium falls along the lower curved portion of the S-shaped curve depicting the remanent magnetism-magnetizing force characteristic of the recording medium; means operatively coupling said signal source in exciting relation to said transducer with such amplitude that the resultant recording field variations produce recording magnetizing forces which are at a minimum during said synchronizing pulses and the peak to peak amplitude of which do not extend beyond the lower and upper curved portions of said S-shaped characteristic; and direct current clamping means direct current coupled with said transducer responsive to the synchronizing pulse component of said television signal to maintain recording magnetizing forces produced by said transducer which represent said synchronizing pulse at a substantially fixed position along the lower curved portion of said S-shaped characteristic.

4. In a system for recording on a moving magnetic recording medium television signals containing a video frequency picture component, and a periodically recurrent synchronizing pulse component, said pulse component being uniformly defined by signal waveform excursion exceeding in amplitude those signal excursions defining said picture component, said magnetic recording medium having a remanent magnetism-magnetizing force characteristic graphically depicted by a substantially S-shaped curve having a curved lower portion representing remanent flux storage characteristics for low magnetizing forces, a substantially linear central portion representing remanent flux storage characteristics for a range of moderate magnetizing forces and a curved flattened upper portion representing flux storage characteristic for higher magnetizing forces, the combination of: a source of television signals of the type described; a magnetic recording transducer including means for transducing an applied electrical signal into representative variations in a magnetic recording field such that said recording transducer when in recording relation to a moving magnetic recording medium is capable of imposing a varying magnetizing force productive of remanent field patterns on said medium representing a record of applied electrical signals; direct current biasing means direct current coupled with said transducer to establish a bias current therethrough productive of a static magnetizing force which when imposed upon a magnetic recording medium falls along that section of the S-shaped curve depicting the remanent magnetism-magnetizing force characteristic of the recording medium which is defined between the upper part of said curved lower portion and the lower part of said central portion; means operatively coupling said signal source in exciting relation to said transducer with such amplitude that the resultant recording field variations produce recording magnetizing forces which are at a minimum during said synchronizing pulses and the peak to peak amplitude of which do not extend beyond the lower and upper curved portions of said S-shaped characteristic; and direct current clamping means direct current coupled with said transducer responsive to the synchronizing pulse component of said television signal to maintain recording magnetizing forces produced by said transducer which represent said synchronizing pulse at a substantially fixed position along the aforesaid section of the S-shaped curve upon which said static bias magnetizing force falls.

5. In a system for recording on a moving magnetic recording medium television signals containing a video frequency picture component, and a periodically recurrent synchronizing pulse component, said pulse component being uniformly defined by signal waveform exceeding in amplitude those signal excursions defining said picture component, said magnetic recording medium having a remanent magnetism-magnetizing force characteristic graphically depicted by a substantially S-shaped curve having a curved lower portion representing remanent flux storage characteristics for low magnetizing forces, a substantially linear central portion representing remanent flux storage characteristics for a range of moderate magnetizing forces and a curved flattened upper portion representing flux storage characteristics for higher magnetizing forces, the combination of: a source of television signals of the type described; a magnetic recording transducer including means for transducing an applied electrical signal into representative variations in a magnetic recording field such that said recording transducer when in recording relation to a moving magnetic recording medium is capable of imposing a varying magnetizing force productive of remanent field patterns on said medium representing a record of applied electrical signals; direct current biasing means direct current coupled with said transducer to establish a bias current therethrough productive of a static magnetizing force which when imposed upon a magnetic recording medium falls along that section of the S-shaped curve depicting the remanent magnetism-magnetizing force characteristic of the recording medium which is defined between the upper part of said curved lower portion and the lower part of said central portion; means operatively coupling said signal source in exciting relation to said transducer with such signal amplitude that the resultant recording field variations produce recording magnetizing forces substantially within the S-shaped characteristic of the recording medium upon which said transducer is caused to operate; and direct current clamping means direct current coupled with said transducer responsive to the synchronizing pulse component of said television signal to maintain magnetizing forces produced by said transducer in response to said synchronizing pulses at a substantially fixed position on that curved portion of said S-shaped characteristic along which said static bias magnetizing force falls.

6. In a system for recording on a moving magnetic recording medium television signals containing a video frequency picture component, and a periodically recurrent synchronizing pulse component, said pulse component being uniformly defined by signal waveform excursion exceeding in amplitude those signal excursions defining said picture component, the voltage difference between the peak excursions of said synchronizing pulse component and the alternation of current axis of said television signal defining the magnitude of D.-C. picture brightness component in said television signal, said magnetic recording medium having a remanent magnetism-magnetizing force characteristic graphically depicted by a substantially S-shaped curve having a curved lower portion representing remanent flux storage characteristics for low magnetizing forces, a substantially linear central portion representing remanent flux storage characteristics for a range of moderate magnetizing forces and a curved flattened upper portion representing flux storage characteristics for higher magnetizing forces, the combination of: a source of television signals of the type described; a magnetic recording transducer including means for transducing an applied electrical signal into representative variations in a magnetic recording field such that said recording transducer when in recording relation to a moving magnetic recording medium is capable of imposing a varying magnetizing force productive of remanent field patterns on said medium representing a record of applied electrical signals; direct current biasing means operatively coupled with said transducer to establish a current therethrough productive of a static magnetizing force which when imposed upon a magnetic recording medium falls along the S-shaped magnetic characteristic of the recording medium upon which said transducer is caused to operate; and means coupled with said signal source and direct current coupled with said transducer responsive to the direct current component in said television signal as defined by said synchronizing component to develop a corrective current flow through said transducer of a magnitude which when supplementing said bias current maintains said synchronizing pulses at a substantially fixed position along the S-shaped magnetic characteristic of the recording medium.

References Cited in the file of this patent

UNITED STATES PATENTS

| | | |
|---|---|---|
| 789,336 | Poulsen et al. | May 9, 1905 |
| 873,083 | Poulsen et al. | Dec. 10, 1907 |
| 1,974,911 | Buecker et al. | Sept. 25, 1934 |

OTHER REFERENCES

"Magnetic Recording," S. J. Begun, pp. 54–57.